United States Patent [19]
Greef et al.

[11] Patent Number: 6,032,129
[45] Date of Patent: Feb. 29, 2000

[54] CUSTOMER CENTRIC VIRTUAL SHOPPING EXPERIENCE WITH ACTORS AGENTS AND PERSONA

[75] Inventors: Arthur Reginald Greef, Valhalla; John F. Shumacher, White Plains, both of N.Y.; Darko Hrelic, Bridgewater, Conn.

[73] Assignee: International Business Machines Corporation, Armonk, N.Y.

[21] Appl. No.: 08/924,520

[22] Filed: Sep. 6, 1997

[51] Int. Cl.[7] .................................................. G06F 17/60
[52] U.S. Cl. .......................... 705/27; 707/103; 345/335
[58] Field of Search ...................... 705/27, 26; 707/103; 345/335; 709/217, 303

[56] References Cited

U.S. PATENT DOCUMENTS

| 5,309,355 | 5/1994 | Lockwood | 364/401 |
|---|---|---|---|
| 5,319,542 | 6/1994 | King et al. | 364/401 |
| 5,469,206 | 11/1995 | Strubbe et al. | 348/7 |
| 5,630,125 | 5/1997 | Zellweger | 707/103 |
| 5,710,887 | 1/1998 | Chelliah et al. | 395/226 |

OTHER PUBLICATIONS

Database Systems Concepts, Henry F. Korth, Abraham Silberschatz, 2nd ed, 1991.

*Primary Examiner*—Kevin J. Teska
*Assistant Examiner*—Russell W. Frejd
*Attorney, Agent, or Firm*—Steven J. Meyers

[57] ABSTRACT

This invention relates to an electronic commerce software catalog system and a method of use. This electronic catalog system is specifically designed to provide the electronic shoppers with a customer-centric, virtual shopping experience by first facilitating the creation of customer-personas and their catalog-content affinities by a "Sales Representative", secondly facilitating the persona-association based configuration of a "Customer-Actor", by the actual "Shopper". Thirdly, the shopper selects an "on-the-desktop" computer directed "Sales-Advisor", that generates advice on catalog navigation, product applications and product function that is tuned to the proxy customer's configured personality and specific needs.

23 Claims, 5 Drawing Sheets

CUSTOMER CENTRIC VIRTUAL SHOPPING EXPERIENCE WITH ACTORS AGENTS AND PERSONA

BACKGROUND INFORMATION

1. Field of Invention

This invention provides electronic shoppers with a virtual shopping experience by, first facilitating the creation of customer-personas and their catalog-content affinities by a sales person-representative, secondly facilitating the persona-association based configuration of customer-actors by the Shopper. Thirdly it involves the commissioning, by the Shopper, of an "on-the-desktop" computer directed sales-advisor or agent, that generates advice on catalog navigation, product applications and product function that is tuned to the proxy customer's configured personality and specific needs.

2. Background Art

It is well recognized that procurement systems have traditionally been manual, labor intensive and quite costly operations. Suppliers, for example will do mass mailings of catalogs to potential customers, the customers would browse the catalogs and select items to be purchased and then the customer would complete a paper order form, or call the supplier to order the items. The entire process, from preparing the catalog to receipt of the order, is very labor intensive and often took several weeks. If a supplier wanted to continually update his catalogs, or provide different price schedules to different customers, the printing, distribution and administrative costs would be substantial.

On a relatively small scale, some suppliers have offered catalogs through computer services, such as PRODIGY (TM). Employing PRODIGY (TM), a computer user can dial-up a service from home and select items to purchase from various catalogs maintained on the system. Upon selection, PRODIGY (TM) initiates the order with the supplier. While this has made significant improvements in typical procurement situations, there are still numerous needs remaining to be fulfilled.

Current electronic catalog systems which service the customer are generally deficient in several ways. First they are very generalized in the information they provide. These systems are not customer-centric in design. Thus they are generally product oriented and rely on sales associates to make the final sale. Additionally, they do not rely on the personalized characteristics, needs or criteria of the specific buyer in order to narrow the choices of selection to be offered to the customer. This therefore requires excess time on the part of the customer to browse through the catalog in order to make the proper selection. The current electronic catalog systems are unable to advise shoppers on catalog navigation and product features when shopping for somebody other than themselves such as gift shopping. Additionally, the current electronic catalog systems are unable to advise the customer as to those accessories that might enhance the product to be purchased. Thus current electronic catalog systems present all catalog shoppers with the same presentation format based on an internal machine organization of the catalog's content, rather than dynamically generated presentation format based on a customer's individualized personality, interests or needs. This type of internet electronic catalog business limits the merchant's ability to sell since they still do not have the tools with which to fashion target-sales strategies. As a result the current electronic catalog systems are only slightly better than human-centric, direct-marketing strategies employing time consuming and expensive sales staff. In addition current electronic catalog shopping systems are unable to determine, characteristics, personality and traits of the specific shopper for whom they must direct their sales effort.

Contemporary electronic catalog systems are typically lacking in one or more of the following areas:
1. They do not facilitate customer-centric selling procedures that use custom personalized sales advice strategies, but rather facilitate a more product-centric advertising process that relies on sales representatives to make the actual sale.
2. They are unable to advise shoppers on catalog navigation, product features, product applications and product functions when they are shopping for somebody other than themselves such as gift shopping and proxy shopping.
3. They present all catalog shoppers with the same presentation format based on an internal machine organization of the catalog content rather than a dynamically generated presentation format based on a customer's shopping personality and interests.
4. Contemporary systems are unable to view the shopping world through the eyes of the customer.

These electronic catalog handicaps hamper their broad utilization and universal proliferation. Merchants, as a result, still have no tool with which to fashion target-sales strategies. This makes the electronic catalog a poor cousin to human-centric, direct-marketing strategies. They are also unable to incorporate cross-cultural, target-sales strategies into electronic catalogs that are accessed internationally over networks such as the world wide web. Additionally, they are unable to determine the characteristics, personality and traits of the shopper for whom they must direct their sales.

SUMMARY OF THE INVENTION

This invention relates to an electronic commerce software catalog system and a method of use. This electronic catalog system is specifically designed to provide the electronic shoppers with a customer-centric, virtual shopping experience by first facilitating the creation of customer-personas and their catalog-content affinities (by a Sales Representative), secondly facilitating the persona associated based configuration of a "Customer-Actor" by the actual Shopper and thirdly by commissioning an "on-the-desktop" computer directed sales-advisor-agent by the Shopper, that generates advice on catalog navigation, product applications and product function that is tuned to the proxy customer's configured personality and specific needs.

This instant system thus resolves the four deficiency areas in the prior art as outlined above. This innovative approach solves these problems and removes the electronic catalog barriers to one-on-one, direct-sales strategies. It does this by first facilitating the creation of "Customer-Personas" and their "Catalog-Content Affinities" by sales representatives. This leverages a sales representatives experience with customers by encoding their knowledge of customers and of selling products to those customers. Secondly, it facilitates the persona-association-based configuration of customer actors by shoppers who are shopping for themselves or other persons or entities. This mechanism leverages the knowledge that the shopper has of themselves and/or of the person for whom they are providing a gift or proxy shopping. Thirdly, it facilitates shopper commissioning of "on-the-desktop" computer sales-advisory-agents that generate advice on catalog navigation, product features, product application and product function that is tuned to the customer actor's personality. These three facilities are interleaved to provide electronic catalog shoppers with a customer-centric, virtual shopping experience where they receive customized and personalized sales advise.

DESCRIPTION OF THE INVENTION

Overview

Figure 1:
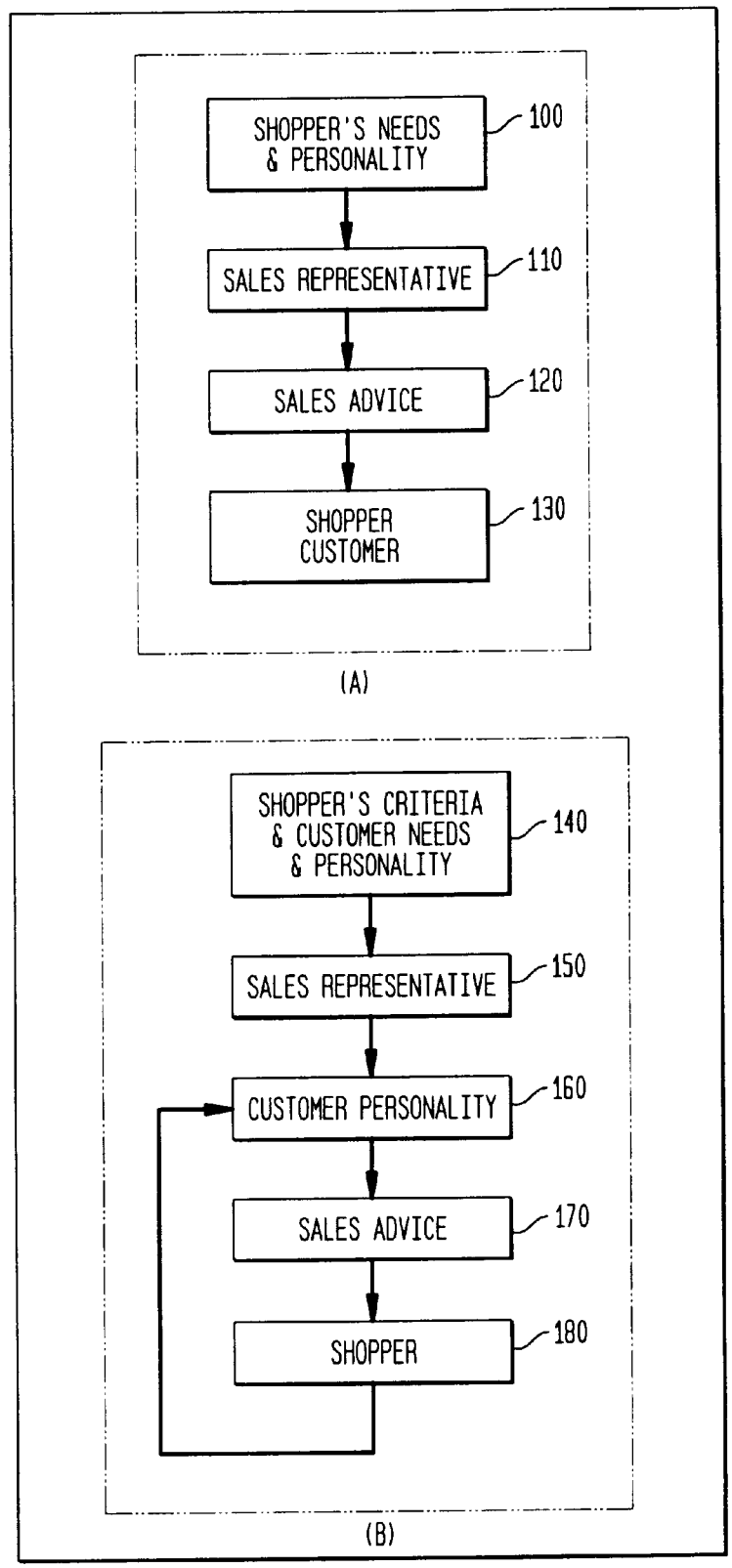
FIG. 1 Demonstrates two types of shopping experiences, shopping for yourself (FIG. 1a) and the second shopping experience is shopping for another person (FIG. 1b).

There are two types of shopping experiences: the first is shopping for yourself and the second is shopping for another person. We term the first type of shopping- "personal shopping" and the second type of shopping "proxy shopping". These two types of shopping are shown in FIG. 1(a) & FIG. 1 (b). FIG. 1(a) depicts the actual shopping experience between a sales representative 110 and a shopper who is shopping for themselves and is considered the customer 130. Thus the shopper and the sales representative interact, where the customer provides data 100 on their needs and their personality and the sales representative responds with several kinds of advice 120 such as, navigation advice that locates the products in the store, advice on product features, function and application advice such as how the product functions and applications for which it is suitable and ranking advice based on the customer's purchasing criteria data such as low cost and durability.

FIG. 1b depicts the actual shopping experience when the shopper is shopping for another person or entity, perhaps for a gift, Here the shopper 180 and the sales representative 150 collaborate to form a common "customer personality" 160. This personality is formed by both the sales representative's experience with similar customers and in conjunction with the shopper's own knowledge 140 of the customer based on their association with that person or entity. In this experience, we see the sales representative attempting to satisfy the customer's needs 140 and the shopper simply making the purchase decision based on product sort/ranking advice 170 and their purchasing criteria e.g. low price. The purchasing criteria, may originate from the shopper if the purchase is a gift or it may be based on instructions from the other person or gift recipient.

Detailed Description of the Invention

Figure 2:
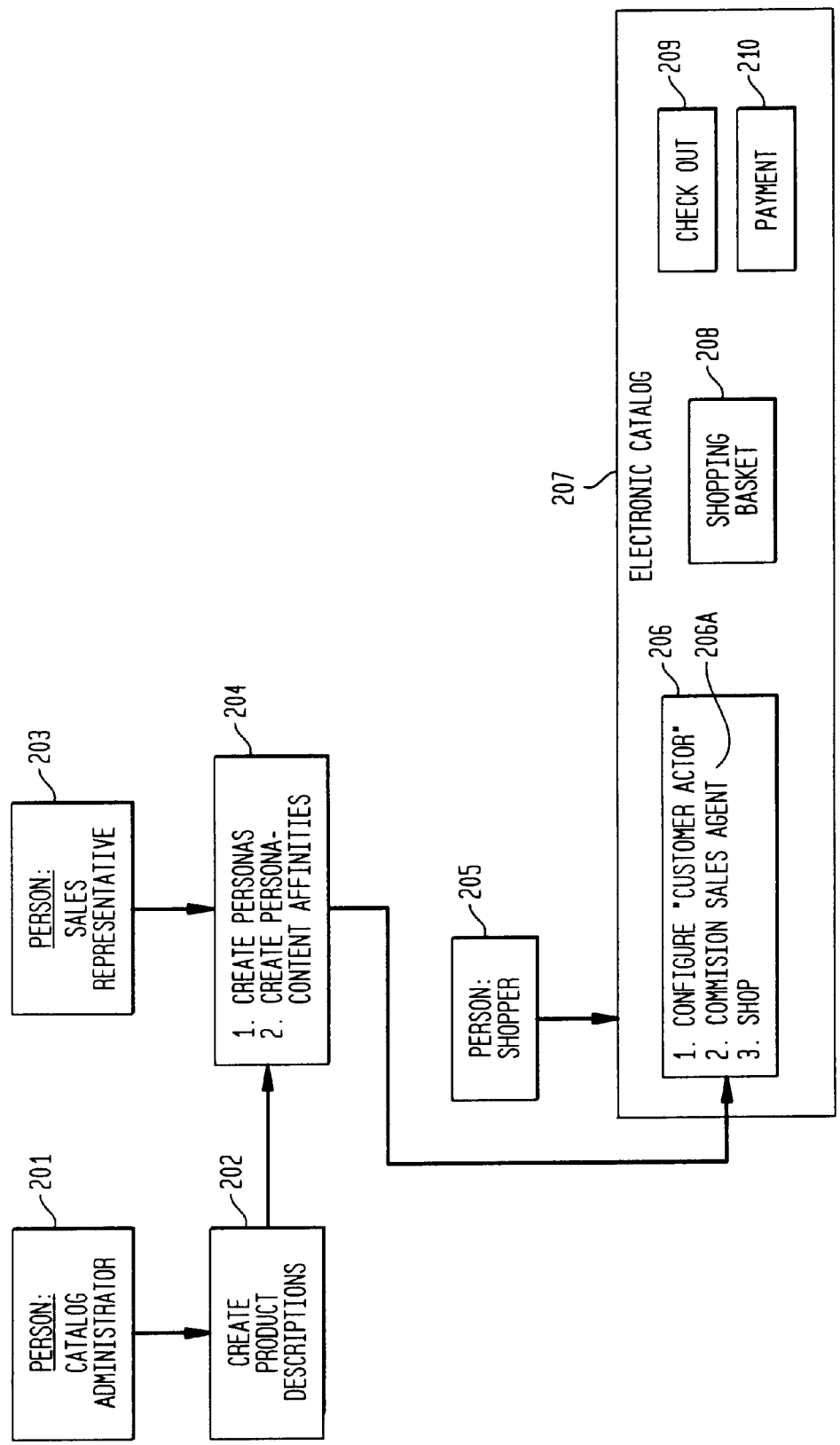
FIG. 2 Demonstrates the provisions of a virtual shopping experience for the sales representative and the shopper.

The central dilemma faced by merchants, when using electronic catalogs for target-selling, lies in the loss of direct, one-on-one customer selling. Shoppers also feel the loss of personal, appropriate advice especially when doing gift or proxy shopping. This dilemma is ameliorated by the provisions of a virtual shopping experience for the sales representative and the shopper as shown in FIG. 2 and represents the basis for this invention.

In this scenario, the person who is the electronic catalog Administrator, reference numeral 201, creates product descriptions reference numeral 202, while the person who is the Sales Representative 203 collaborates to produce typical "Personas" and "Persona Affinities" for products that would be associated with these types of personas 204. The Sales Representative creates specific "customer personas" based on their experience the customers in general. A customer persona is a "Icon" that captures the personality traits of customers. These Icons may be based on real psychological personality traits such as loud or quite personality traits, or may be based on fictitious characters such as those found in for example personas in cartoons of soap operas. The characterizing traits of the personas will vary depending on the product that the merchant is selling and the demographics of the target customer market. Some products for example appeal more to men than woman, some appeal more to a younger generation than to an older one. Another example is selling products across international borders to customers who do not identify with the same characterizing personas.

The sales representative also assigns Affinities between these customer personas and the content in the catalog 204. An affinity is a numerical strength that represents the strength of an association between the customer persona and the catalog content. For example, in a catalog containing both office products and computer products, there is a strong affinity between a secretary persona and office products than there is between a programer's persona and computer products.

Providing these "Customer Personas" to an electronic "Catalog Shopper" 205 enables them to configure a Customer Actor 206 that behaves like a customer to whom the catalog will target its advice. The customer actor may be configured to have the user's own personality traits, someone else's traits or even some image personality traits to which they aspire to, such as for example a rock idol. This enables a degree of shopping flexibility beyond that encountered in the actual world. Usually, people are too shy to project an alter-personality to a strange sales representative. The computer, however, provides a degree of anonymity allowing shoppers to experiment to a far greater degree.

The Shopper then configures a Customer-Actor by persona association 206. This is a numeric strength specifying the degree of similarity (association) between the customer agent and the customer personas. For example, the agent can behave 60% like the Star Trek (TM)'s CAPTAIN PICARD (TM) persona, 20% like CAPTAIN KIRK (TM) persona and 20% like Mr. SPOCK (TM) persona. This will configure a customer actor 206 that is sophisticated enough to drink EARL GRAY (TM) tea, has a fairly strong attraction for members of the opposite sex and is pretty rational and logical enough when making shopping decisions.

Continuing in FIG. 2, the Shopper 205, provides his or her inputs regarding the personal characteristics of the potential recipient of the intended purchase, which interacts with the persona and persona-catalog content affinities 204, to create a imaginary "Customer-Actor" 206. The Shopper further commissions a specific computer based "Sales Agent" 206A.

The shopper 205 then in the virtual shopping experience scenario commissions a selective and particular Sales Agent 206A, to provide advise to the customer-actor 206 based on their specific needs and shopping personality. There may be more than one Sales Agent with differing sales characteristics. Selecting the sales agent of your choice is similar to being able to choose sales agent when entering a store. Each one may have a different area of specialization or expertise. Once a specific computer based sales agent is selected by the Shopper, in the electronic catalog system 207, the agent provides the specific advise to the shopper who can then shop based on this advise 208, check out 209 and pay for the items purchased 210.

Figure 3:
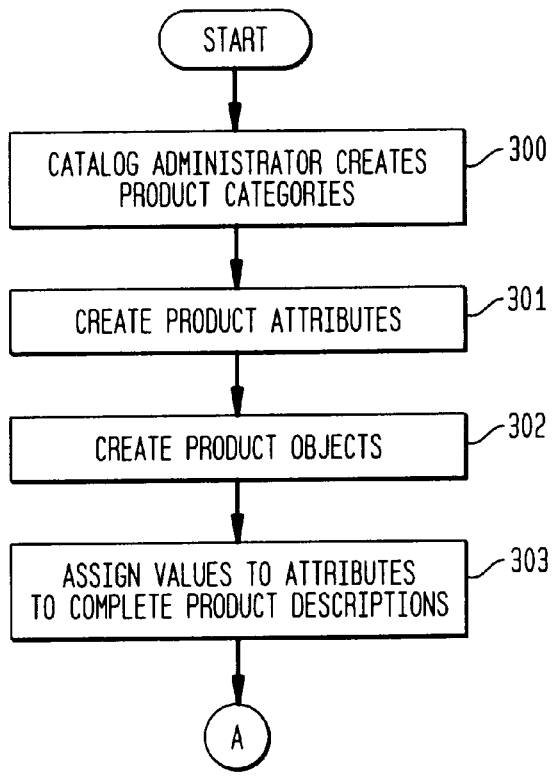
FIG. 3 Demonstrates the components, participants and operations of the "Virtual shopping Experience" System.
Figure 4:
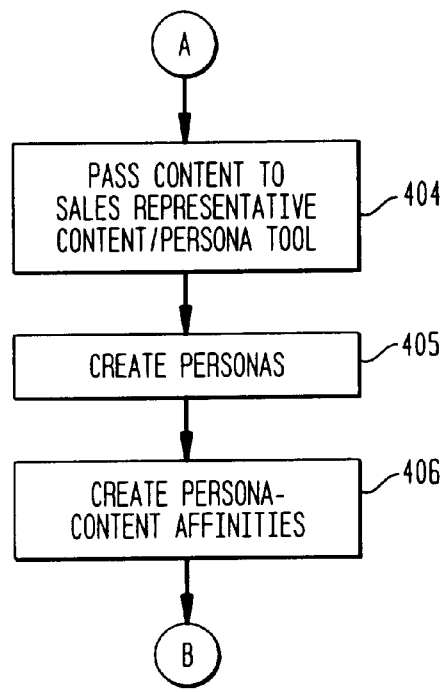
FIGS. 4–6 Represents the logic flow charts for the "Virtual shopping Experience".

The components, participants and operations of the "Virtual Shopping Experience" System are seen in FIG. 3 through FIG. 6 flow charts. FIG. 3, defines the "Administrator's" responsibilities for the electronic catalog. The Administrator, Block 300 creates product descriptions and also creates product attributes Block 301, creates product objects Block 302 and then assigns values to the attributes to complete the product description Block 303 for the electronic catalog. The content of Block 303, is then passed to the "Sales Representative" in FIG. 4, Block 404, for a joint cooperative effort to create Personas FIG. 4. Block 405 and subsequently create "Persona Affinities" Block 406. This completes the tasks of the Sales Representative 406. The content of both Block 405 and Block 406 are then passed on to FIG. 5, the Electronic Catalog Block 507. The "Shopper" then configures the "Customer Actor" Block 508 by specifying affinities between the customer actor and persona and subsequently selects computer designated "Sales Agents" Block 509 to provide sales advice to the customer while they are shopping.

Figure 5:
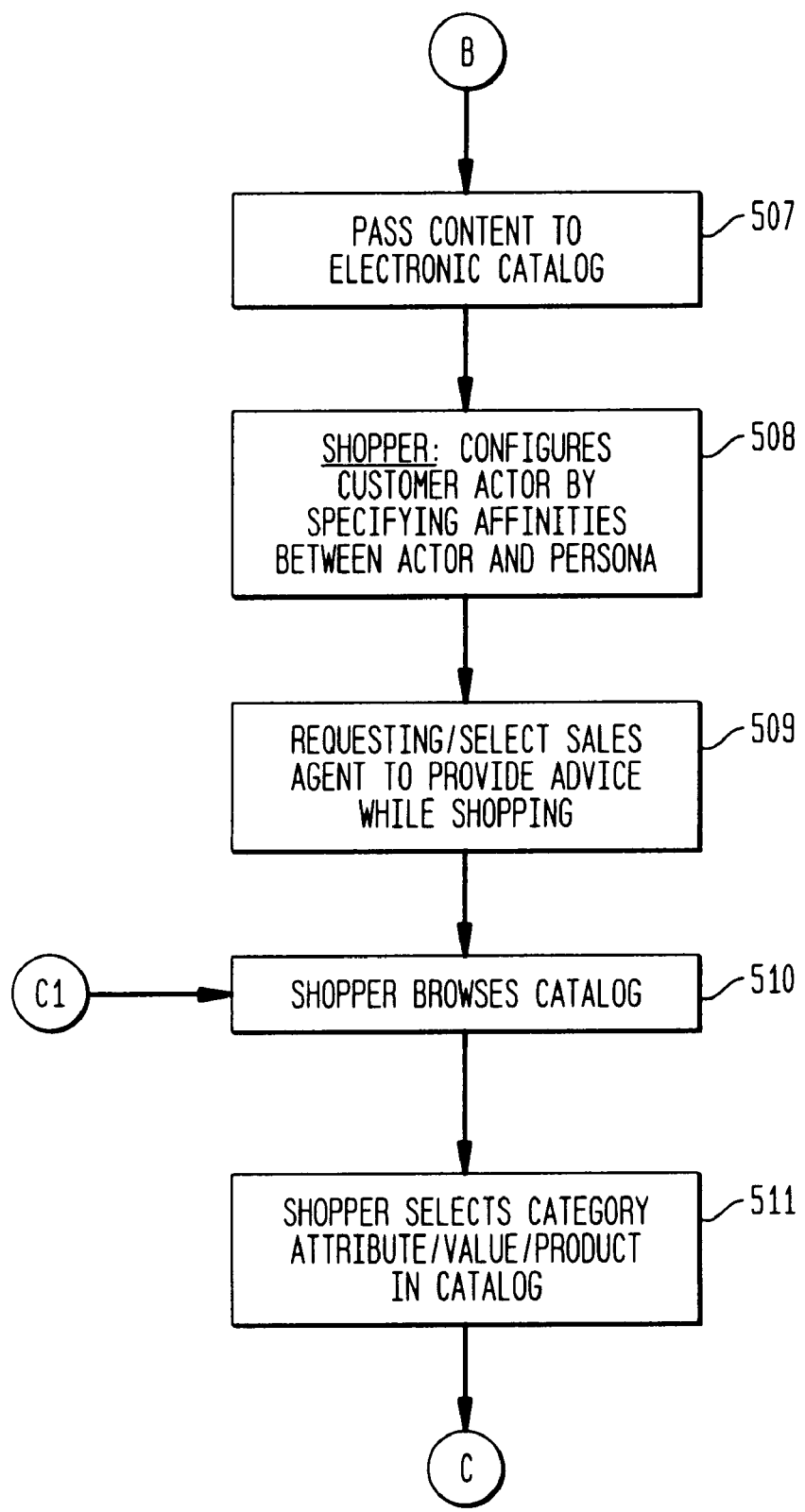
Figure 6:
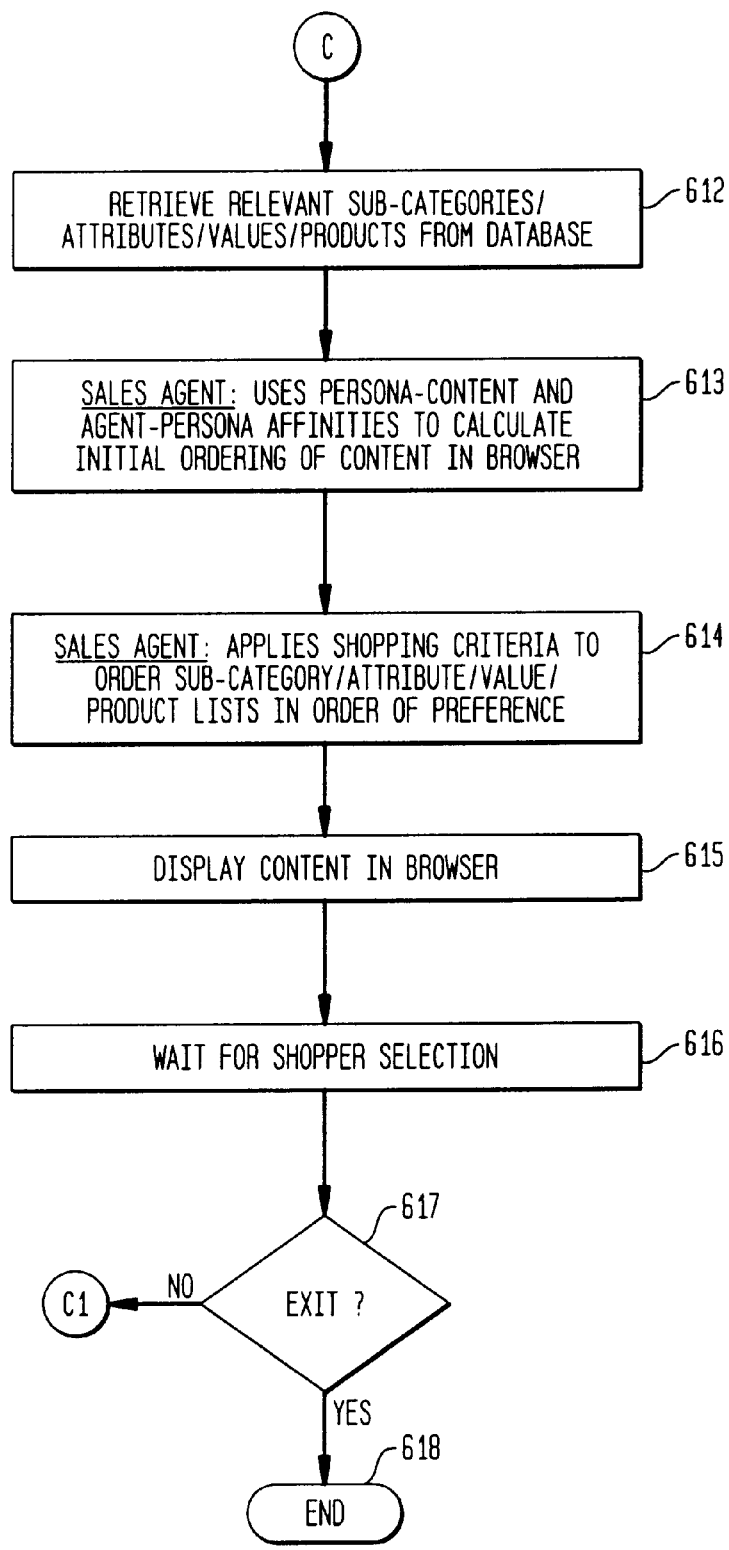

The "Shopper" browses the electronic catalog FIG. 5, Block 510 and selects the category, attributes, value products in the catalog, Block 511. The computer driven electronic catalog system then retrieves relevant sub-categories, attributes, values and products from the database, FIG. 6. Block 612. The "Sales Agent" then uses Persona-content and Sales Agent-persona affinities to calculate initial ordering of content in the browser Block 613. The computer controlled Sales Agent FIG. 6 Block 614 then applies shopping criteria to order sub-categories, attributes, values, product lists in order of preference and subsequently displays the content in browser Block 615. The Sales Agent then awaits the Shopper's selection Block 616 for ordering. The question is then raised at the next decision point Block 617 as to whether the Shopper wishes to exit after completing the ordering and payment procedure. If the answer is yes, then the Shopper exits the system Block 618. If the answer to the decision is no, then the process returns back to FIG. 5, Block 510 where the Shopper again has another opportunity to browse the catalog for additional purchases.

We claim:

1. An electronic catalog comprising:
    product descriptions of the goods available thru the catalog;
    customer persona descriptions defining a plurality of customer types and persona-content affinities linking each of the defined customer types to one or more product descriptions;
    a plurality of virtual sales representative types with differing sales characteristics to advise a shopper;
    a selection mechanism for permitting the shopper to form an imaginary customer actor based on the personas defining the customer types and in addition to select one of the virtual sales representative types to advise the shopper on progress through the catalog selection and ordering process; and
    a presentation mechanism for presenting by the selected virtual sales representative to the shopper those product descriptions attuned to the imaginary customer-actor's characteristics interest based on the persona-content affinities.

2. The electronic catalog of claim 1, wherein said affinities each comprise a numerical value that represents the strength of the association between one of the personas and a product description.

3. The electronic catalog of claim 2, wherein said selection mechanism enables the shopper to generate a customer actor which is a composite of two or more of the personas contained in the catalog.

4. The electronic catalog of claim 3, wherein the selection mechanism provides for identification of the customer actor by the shopper as himself or herself or a third party.

5. The electronic catalog of claim 4, including in the selection mechanism means to indicate that the goods selected are gifts.

6. The electronic catalog of claim 5, wherein the product descriptions include product attributes, objects and values and are linked to the virtual sales representative.

7. The electronic catalog of claim 6, wherein the selected sales representative can advise the shopper on catalog navigation, product applications and product function attuned to the customer-actors personality and needs.

8. A program product carried on a physical medium for use in a computer, said program product being an on-line catalog comprising:
    product software containing product descriptions of goods or services available thru the catalog;
    persona software containing customer personas defining a plurality of customer types and persona-content affinities linking the customer types to product descriptions;
    salesman software containing a plurality of virtual sales representatives with differing sales characteristics to advise a shopper;
    selection software providing a selection mechanism permitting the shopper to form an imaginary customer-actor based on the personas defining the customer types and in addition to select one of the virtual sales representatives to advise the shopper on use of the catalog; and
    presentation software for presenting to the shopper those product descriptions attuned to the imaginary customer-actor's characteristics based on the affinities established between the personas and the product descriptions.

9. The program product of claim 8, wherein in the persona software said affinities each comprise a numerical value that represents the strength of the association between one of the personas and a product description.

10. The program product of claim 9, wherein in said persona software is for enabling the shopper to generate a customer actor which is a composite of two or more of the personas contained in the catalog.

11. The software product of claim 10, wherein said selection software provides for identification of the customer-actor by the shopper as himself or herself or a third party.

12. The software code of claim 11, the selection software includes means to indicate a selection is a gift.

13. The product of claim 12, wherein in the product software the product descriptions are provided with product attributes, objects and values linked to the virtual sales representative.

14. The product of claim 13, wherein in the salesman software code the virtual sales representative advises the shopper on catalog navigation, product applications and product functions attuned to the actor-customer's characteristics.

15. A method of providing a shopping experience using an electronic catalog comprising:
    providing in the catalog product descriptions of goods available thru the catalog and a plurality of customer personas setting forth a plurality of customer types;
    associating the customer personas to the product descriptions with persona-product affinities linking the customer types to product descriptions;

permitting the shopper to form all imaginary customer-actor based on one or more of the personas defining the customer types; and presenting to the shopper-product descriptions attuned to the customer-actor's characteristics based on the affinities established between the personas and the product descriptions.

16. The method of claim 15, including the step of using in each affinity a numerical value that represents the strength of the association between the customer-persona and the product description.

17. The method of claim 15, including the step of enabling the shopper to select from a plurality of virtual sales representative types for the presentation of the product descriptions.

18. A method of organizing and presenting an electronic catalog for use by a shopper comprising:

providing in the catalog product descriptions of goods available through the catalog, customer personas defining a plurality of customer types, and a plurality of virtual sales representative with differing sales characteristics to advise a shopper;

associating the customer personas to the product descriptions using persona-product affinities linking each of the personas to one or more of the product descriptions;

permitting the customer to form an imaginary customer-actor based on the personas defining the customer types and to select one of the sales representative for advice on the catalog selection and ordering process; and presenting the catalog content to the shopper in terms of the customer-actor's characteristics based on the affinities established between the personas of the product descriptions.

19. The method of claim 18, including the step of providing a numerical value in the affinities that represents the strength of the association between each customer persona and the product descriptions.

20. The method of claim 19, including the step of enabling the shopper to generate a customer actor which is a composite of two or more of the personas contained in the catalog.

21. The method of claim 20, including the step of providing for identification of the customer-actor by the shopper as himself or herself or a third party.

22. The method of claim 21, including the step of dividing the product descriptions into categories and providing them with product attributes, objects and values.

23. The method of claim 22, having the sale representative advising the shopper on catalog navigation, product applications and product function attuned to the actor-customer's characteristics.

* * * * *